United States Patent [19]

Brigman

[11] Patent Number: 5,089,129
[45] Date of Patent: Feb. 18, 1992

[54] FLUID CONTAMINATE FILTRATION SYSTEM INCLUDING A FILTER, A CONTAMINATE PARTICLE TRAP, AND A COLD START FLUID CIRCULATION SYSTEM

[76] Inventor: Bernard B. Brigman, 6816 W. Lake Anne Dr., Raleigh, N.C. 27612

[21] Appl. No.: 518,721

[22] Filed: May 4, 1990

[51] Int. Cl.⁵ .............................................. B01D 35/06
[52] U.S. Cl. .................................. 210/223; 210/541; 210/542
[58] Field of Search ..................... 210/222, 223, 333.1, 210/541, 542

[56] References Cited
U.S. PATENT DOCUMENTS 4,183,591 1/1980 Mayer ................................ 210/222
4,415,448 11/1983 Lennartz et al. ................. 210/333.1

Primary Examiner—Frank Sever
Attorney, Agent, or Firm—Joseph J. Zito

[57] ABSTRACT

A filter component for aiding in the removal of particulate matter from a circulating lubrication fluid. Several embodiments utilize magnetic attraction of particulate matter to remove the matter from the fluid. Removal of extremely small matter aids in the prevention of clogging of straining type filtering elements and further cleans the fluid. The magnetically attractive element will trap and remove particles which are of a size too small to be inhibited be straining type filter elements. The component can be implemented in a number of ways, alone, or in conjunction with a straining type filter element, such that the component attracts the particles away from the element and out of the fluid flow stream.

19 Claims, 5 Drawing Sheets

FLUID CONTAMINATE FILTRATION SYSTEM INCLUDING A FILTER, A CONTAMINATE PARTICLE TRAP, AND A COLD START FLUID CIRCULATION SYSTEM

The present invention relates to the filtration of circulating fluids in machines, and particularly to the filtration of foreign particulate matter from lubrication fluids.

The common paper filtering elements found in spin-on canister filters do not provide efficient oil filtration. Conventional filters are acceptable at trapping metallic particles, down to a certain micron size. An engine is constantly shedding itself of extremely fine metallic particles, as a result of normal wear. These fine particles are not trapped by a conventional oil filter but instead pass through. If this normal operational characteristic is not bad enough, this cast-off metal is absorbed directly into the circulation of the very life blood of the engine, the oil. Whatever amount of magnetic matter is not permanently trapped by the filter will be circulated throughout the entire engine, including the rings and bearings, which in turn causes increased wear, producing ever increasing amounts of particulate matter. Equally important is the fact that over the long term, these untrapped ultra-fine particles have a "cumulative effect" within all engine bearings and, of consequence, yield much larger effective permanently embedded metallic masses on bearings which, in turn, serve to greatly promote engine wear and eventually shorten engine life expectancy.

To make things even worse, filters have a twofold problem: When they become dirty and partially clogged-up, they often, due to restriction, can actually filter more effectively. Conversely, this partial clogging is undesirable because these very restrictions impede oil flow through the filter, as would a "finer" filtering element, which would only serve to become clogged that much sooner. If this situation was allowed to worsen, in the case of a "full-flow" filter, rupture or even filter blow-off could occur, whereas, in oiling systems with non full-flow filters, totally unfiltered dirty oil would be allowed to recirculate back through the engine via the pressure by-pass valve.

Double-filters can provide an extra degree of filtration, but still can only compromise within such physical limits, using common elements this flow-versus-filtration trade-off.

In order for filters to permit sufficient flow, they must allow particles of a certain size to pass through, even though the size can be considerably small. For years manufacturers have been selling and, consequently, automotive racers have been installing and using magnetic-tipped oilpan drain plugs to attract a number of the finer particles away from the filter element in order to forestall premature engine wear. Further, engine magnet sets, to be placed in strategic locations inside the engine, at the Racer's discretion, have also been available. Further, it has been known to place magnets in non spin-off type transmission filters and Rear-End drain-plug tips.

Filters which utilize magnetization to aid in filtration are known, such as taught in the patent to Garrity U.S. Pat. No. 4,629,558, which teaches a disposable filter with a magnetic insert. However, this design does not teach trapping and storing debris on the interior walls of the filter can. Further, the use of "a perforated metal sleeve" placed in the direct, final stream of flow to the engine can result in metal particle cluster separation. Also, several of the designs are too expensive and wasteful of magnetic material to be practically considered "disposable". Garrity teaches the placement of the magnetized insert around the filter cartridge and does not teach magnetization of the entire filter can.

The filtration taught in Hayashi U.S. Pat. No. 3,887,469 suffers from metallic shed-off, reduced flow, and possible clogging of the conventional element. As do the devices taught in the patents to Hebert U.S. Pat. Nos. 4,642,183 and 4,501,660. The design taught in the Krow Patent U.S. Pat. No. 4,450,075 restricts the return of smooth oil flow to the engine, and invites mass destructive particle separation and re-entry into the engine. Whereby the particles, now being magnetized and in a larger than ever mass, are more potentially destructive to the engine.

The filter taught in Liaw U.S. Pat. No. 4,218,320 lends itself to terrible amounts of "magnet-loading" and consequential mass particle separation, especially in situations where the filter mount is somewhat inverted. Also, installation and electrical connection of the electromagnet is cumbersome. Shoemaker U.S. Pat. No. 4,613,435 teaches the use of a magnetic material alone and therefore does not filter non-ferrous debris. The devices taught in Morelli U.S. Pat. Nos. 4,705,626 and 4,663,034 are not of the remote, disposable, spin-on design. Also, it lends itself, by design, to substantially reduced area and consequent filtration, of non-ferrous particles. Finally, to be of appropriate size for sufficient contaminate removal, it would be too awkward and space-consuming for the average engine compartment, as well as too expensive for the consumer.

Miyata U.S. Pat. No. 3,800,914 teaches an extended magnetic plug, and dictates that the oil pan be specially modified to accept it. The device provides little, if any, protection from non-ferrous debris. But of a less obvious nature, and equally serious, is the poor design which can lead to engine oil-starvation at the pump with consequent damage during periods of vehicle acceleration and/or deceleration, depending on fore or aft pump location in the pan. First, it is imperative that the oil return to the pump be unimpeded. This design, by placing the pump pick-up tube strainer far too high above the pan sump floor, creates potential pump feed problems. The use of this filter could result in an oil starved engine, especially in common situations such as turns or accelerations, in which "tipping" or angling of the oil reserve is experienced.

An examination of the prior art reveals a number of common design flaws which are overcome by the present invention. First, the art does not teach an externally-removable magnet. Second, the devices utilize inferior ceramic or alnico magnetic material, as opposed to superior Rare Earth magnetic material. Third, the devices often fail to provide for cost-saving and waste-reducing transferability of the permanent or electro magnets. Fourth, the devices fail to provide a drain plug for the easy drainage of filter's cancer-causing oily mess. Fifth, some filters fail to provide any filtration for non-magnetic non-ferrous debris. Sixth, some devices yield no benefit of extended filter life. Seventh, some require the removal and complete disassembly of the filter canister in order to replace the filter element and/or the magnetic material. Eighth, some reduce oil-flow through the conventional filtering element. Ninth, many fail to teach the use of externally-insulating covers to prevent the unwanted pick-up of possible external environmental debris from magnetic forces. Tenth, the prior art fails to teach the use of a mechanism in the return-tube, which flows directly back into the engine, to prevent clusters of magnetized particles from dumping right into engine when the electromagnet is switched off. This is especially important in situations where the filter is mounted to the engine block at either a 45, 90, or 180 degree angle. Eleventh, some give no specific practical details of intended electrical hook-up, nor physical application. Twelfth, the prior art teaches the location of magnets in incorrect places which can lead to filter clogging, to reduced flow through the filter element and/or engine return tube, or to cluster separation from the magnet. The inadequacy of design can lead to oil starvation of the engine and/or the introduction of self-adhering particulate clusters. For a filter to be effective and successful, the entire scope of the engine must be factored and accounted for, and the total effect on the lubrication system must be accommodated.

Magnets placed between the conventional filtering element and the engine, as is done with several Prior Art filters, will filter even smaller particles than this filter element, however, as particles collect on the magnet, they become magnetized and, eventually, one large cluster. The larger this cluster becomes, the easier it can be swept away, especially if the magnet is not properly removed for cleaning. Once this mass has been dispelled from the magnet, as would be achieved from its location within the high velocity flow of the oil return area of the oil filter, it is then free to pass directly into the engine, not as microscopic particles, but as one large cluster. In applications where the magnets are situated externally of the conventional element, this non-retained cluster can invade the element, causing filter clogging and reduced flow, as well as reduced filter life.

SUMMARY OF THE INVENTION

Magnetization is most critically needed in the oil filter itself. Trapping engine-destroying metallic shavings in the engine's intended disposable spin-on/off garbage can, the oil filter is an object of the present invention.

It is an object of the present invention to provide an improved filtration system for an engine which maintains the basic design of the conventional oil filter, the circulation features and valving.

It is an object of the present invention to provide an effective filter for removal of fine particulate matter from oil.

It is another object of the present invention to provide for a magnetized engine filter to remove matter from contaminated oil.

It is a further object of the present invention to provide a filtration device which will operate in conjunction with the filter elements found in all spin-on canister style filters, as these are imperative for removing dirt, certain chemical impurities, and non-magnetically attracted particulate.

It is yet another object of the present invention to provide a filtration device which not only traps and retains more metal particulate and finer size metal particulate, but further separates the metal from the filter paper, effectively reducing filter clogging and increasing filter life. Thereby effectively reducing the duty load of the filter element.

It is still another object of the present invention to provide a filtration device which increases filtration without a reduction of smooth oil flow.

The present invention teaches magnetization of the common spin-on engine oil filter canister as well as magnetic and nonmagnetic traps within the fluid system and the use of rare earth magnetic plugs. According to the present invention, magnetization can be accomplished by permanent magnets or electromagnets.

Even with total filtration of engine oil, a significant amount of wear can be caused during engine start-up because the moving parts of the engine are typically void of lubricant, as the fluid has drained to the oil pain as the engine sits idol. The present invention therefore teaches a system for providing clean filtered lubricant to the engine during the critical start-up period. Through the use of an auxiliary pump, started immediately prior to engine ignition, which draws lubricant from the reservoir, typically the oil pan, and provides this lubricant to the engine oil galleys, the engine will receive the critical clean oil necessary at start-up.

The auxiliary pump also allows for drainage of the entire lubrication fluid without removal of the oil pan drain plug. The pump can be activated in the event of a main oil pump failure to serve as an emergency back-up system. The activation of the pump can be automatic or manually implemented.

BRIEF DESCRIPTION OF THE DRAWINGS

For a better understanding of the nature of the present invention, reference is had to the following figures and detailed description, wherein like elements are accorded like reference numerals, and wherein.

DETAILED DESCRIPTION OF PREFERRED EXEMPLARY EMBODIMENTS

Figure 1:
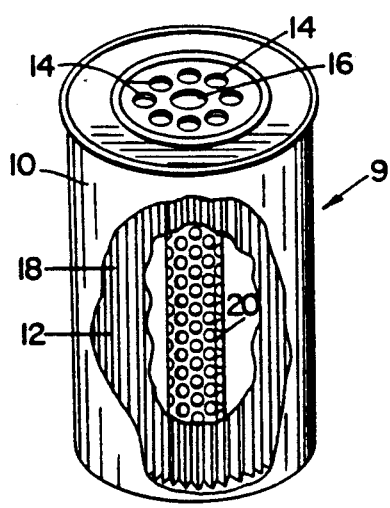
FIG. 1 is a simplified cutaway perspective view of a spin-on type oil filter of the prior art.

Oil or fluid filters are typically utilized to clean the circulating fluid of a lubrication system for a machine. As illustrated in FIG. 1, an oil filter 9 typically includes an outer casing 10 and a filter element 12. The element is designed to prevent particulate matter from flowing through by providing a barrier of limited porosity. Inlet holes 14 and outlet hole 16 are provided in the housing 10 to allow oil to flow into and out of the filter 9. The element 12 is typically shaped as a cylinder and space 18 (as better illustrated in FIG. 2) is left between the filter element 12 and the housing 10.

In operation, oil enters holes 14 and flows around the outside of the filter element 12, filling space 18. The oil is drawn through the element 12 and enters outlet tube 20 positioned inside the element 12 cylinder. The oil then exits the filter 9 through hole 16 and flows through the lubrication system of the machine to which the filter is attached.

As described above, the elements 12 are deficient at removing all harmful particulate matter. Further, a large portion of the matter which would remain unfiltered is magnetically attractable. The present invention teaches a number of embodiments which rely upon this magnetic attraction to draw these particles away from the filter element 12 and to trap this material so that it is removed from the fluid flow. Some of the embodiments utilize permanent magnets and some utilize electromagnets.

A number of design considerations must be evaluated in implementing the various embodiments of the present invention as taught herein. A number of the designs are disposable. The invention can be implemented as a whole filter cover or a magnetized base. The magnetic device can be integral with the primary spin-on housing 10 or a separate add on entity. A number of diverse magnetic materials can be utilized, different materials presenting various advantages and disadvantages in the various embodiments.

Figure 2:
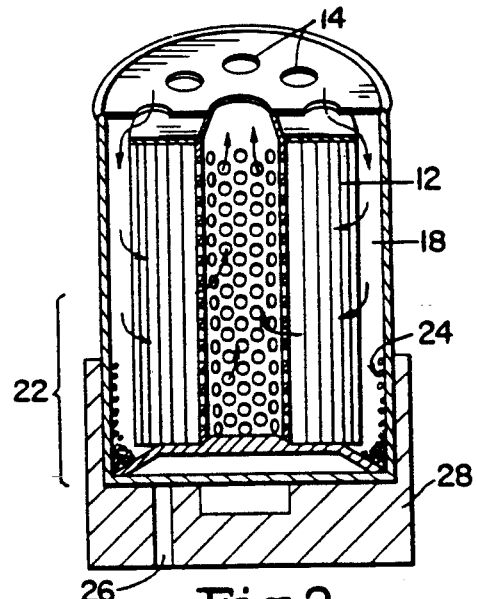
FIG. 2 is a schematic cross sectional view of a first embodiment of the present invention.
Figure 3:
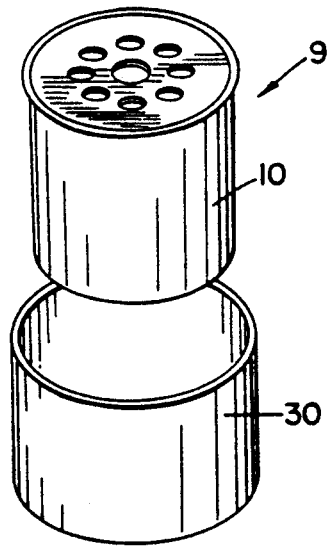
FIG. 3 is a perspective view of the full cover embodiment of the present invention.
Figure 4:
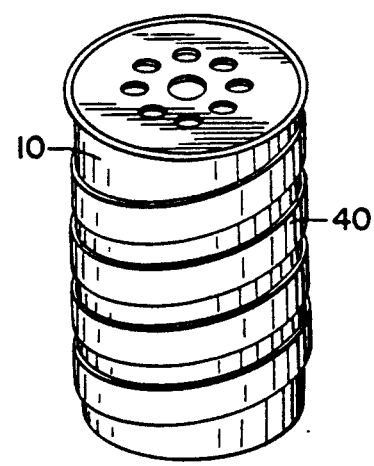
FIG. 4 is a perspective view of the permanent magnet wrap embodiment of the present invention.

FIG. 2 illustrates a magnetic base embodiment of the present invention, while FIG. 3 illustrates a permanent magnet cover embodiment. FIG. 7 demonstrates the electromagnetic wrap embodiment, while FIG. 4 illustrates the permanent magnet wrap. The embodiments illustrated in FIGS. 5 and 6 teaches the use of the magnetic device in an integral form and therefore may be disposable. The magnets of FIGS. 5 and 6 could be designed as removable therefore rendering the filter disposable while the magnet remains reusable. The embodiments of FIGS. 9 and 10 teach a separable device for implementing the magnetic attractive qualities of the present invention to allow for magnetic enhancement to filtration without modification to existing filters. This allows for ease of application and a wide variety of uses.

No ferrous metal, or as little as possible, should be used in the construction of the filter element 12, as it should be as free from magnetic attraction and clogging as possible. If the element 12 contains magnetizable components, these components can become attractive to particulate matter in the presence of the magnet and therefore become prematurely clogged.

FIG. 2 illustrates the magnetic base embodiment of the present invention. The base cap 28 is configured to slide over the base end of the existing filter housing 10. The cap 28 should cover one-quarter to one-half of the total length of the housing 10. The cap 28 houses a permanent magnet, and can be magnetically insulated on its exterior surface to avoid attraction of external debris as described above. While the magnetic base cap 28 makes direct contact with the base of the filter housing 10, the housing 10 becomes magnetized as a temporary or secondary magnet. This magnetization is especially concentrated within the lower half or base portion 22 of the housing 10. Potentially engine-damaging ferrous particles 24 are now held harmlessly against the housing inner walls, to later be thrown-away with disposable filter 9. The cap 28 can be reused by sliding the cap 28 onto the housing of a new filter.

The most cost-effective magnetic material for constructing the permanent magnet would be magnetic ceramic material, Type V or VIII, although a less-powerful Type I, high-force flex, and/or a more expensive Aluminum-Nickel with Rare-Earth "ring" could be used. The ceramic material should be magnetized with multiple radial poles on the filter can contact side only. The cap 28 can be provided with one or more vent holes 26 to aid removal and insertion of the cap 28 by relieving vacuum and compression between the cap 28 and the housing 10.

The full cover embodiment is illustrated in FIG. 3. The cover 30 is comprised of magnetic material and is designed to fit entirely over the filter housing 10, except for the top end which attaches to the fluid circulation system. The cover 10 is made of a flexible magnetic material and conforms to the housing outer surface. Preferably the cover 30 is comprised of a material referred to as "Flexible High-Force" magnetic composition. This material has a workable temperature up to 250 degrees F, which should be adequate for automotive and other machinery applications involving high lubricating fluid temperatures. The cover 30, when slid over the filter 9, will effectively magnetize the entire inside surface of the housing 10 yielding magnetic attraction, and therefore filtration, of ferrous particles over an extensive surface area. The Flexible High-Force material should be magnetized with multiple-poles, and only on the interior surface. This cover 30 can also include one or more vent holes not illustrated, for ease of insertion and removal. The cover 30 is removable and reusable after discarding of the filter 9.

FIG. 4 illustrates the use of a permanent magnetic strip 40 wrapped around the exterior of the housing 10 to provide the magnetization of the filter housing 10. The magnetic strip 40 can be comprised of self-adhering magnetic material utilizing "Flexible High-Force". The material should be given the same one-sided, multiple-pole magnetization as the cover 30 of FIG. 3. The strip 40 has the advantage of being adaptable to any size of shape housing 10. The strip 40 can be supplied in continuous ribbon form, which is spirally wound or wrapped around the filter 9. The strip 40 can be utilized in conjunction with the cap 20 to provide a more comprehensive magnetic coverage. The strip 40 can be reusable and therefore economical.

Figure 5:
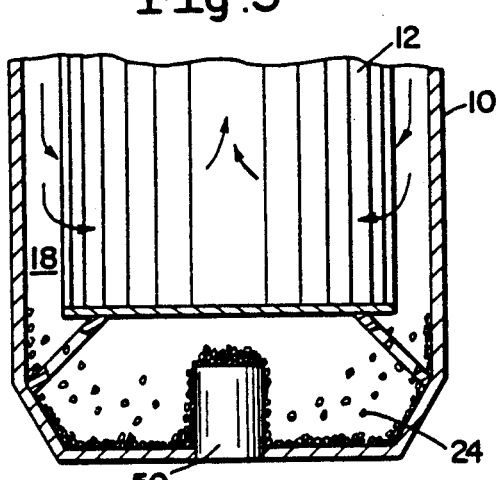
FIG. 5 is a cross-sectional view of another embodiment of the present invention.

Alternatively, the magnetic material can be included integral to the filter 9, as illustrated in FIG. 5. The internal magnet 50 is integrated into the filter 9. The incoming unfiltered engine oil and the destructive particulate matter 24, come in direct contact with the permanent magnet 50. The filter 9 can be constructed so the magnet 50 is either removable or non-removable. Consequently, the magnet may be reusable or the entire filter 9 may be disposable. It is preferable, in the disposable embodiment, that the magnet 50 be non-removable.

The magnet 50 lays attached to the base center within the filter can. The standard base of the housing 10 can be deepened or lowered to provide a larger collection area for filtered particulate matter 24, as illustrated.

Figure 6:
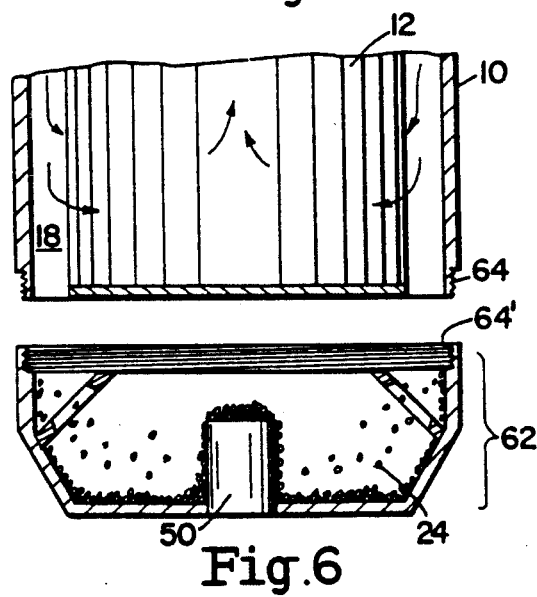
FIG. 6 is a cross-sectional view of a further embodiment of the present invention.
Figure 7:
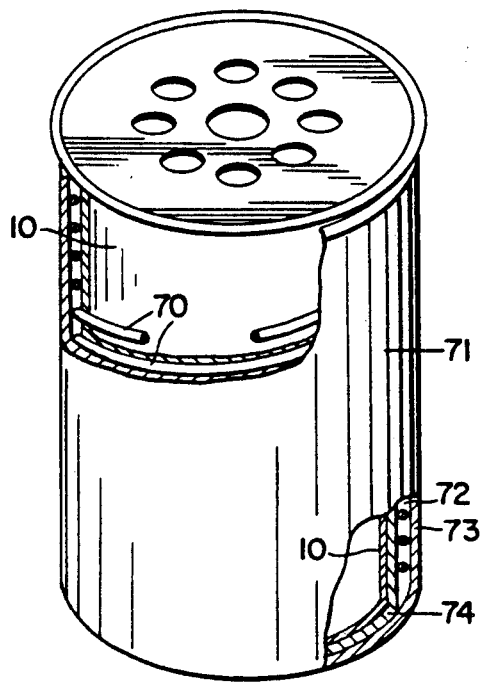
FIG. 7 is a perspective view of the electro-magnet wrap embodiment of the present invention.

As illustrated in FIG. 6, a portion 62 of the base of the housing 10 can be removable. The housing 10 and base 62 include complementary mating threads 64 and 64'. The accumulated particulate 24 can be emptied and the magnet 50 and base portion 62 reused in conjunction with a new filter element 12. Optionally, the magnet 50 alone could be removable and utilized with a replacement one piece housing, while the old housing, element and particulate is disposed of as a single disposable unit.

Figure 8:
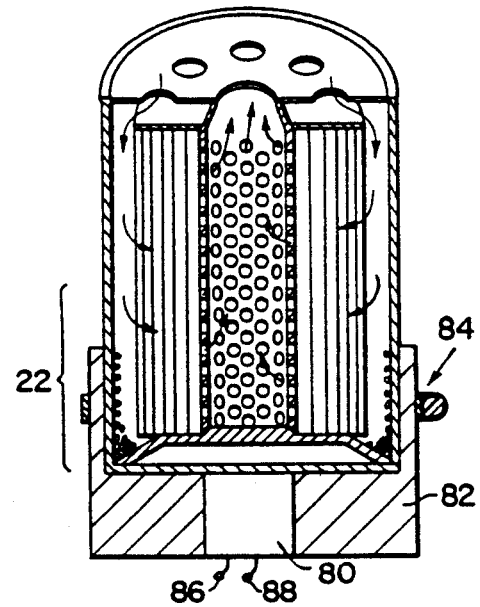
FIG. 8 is a cross-sectional view of an electro-magnetic embodiment of the present invention.

FIGS. 7 and 8 illustrate the electromagnetic embodiments of the present invention. FIG. 7 illustrating an embodiment where the coil wire 70 of the electromagnet is embedded in a middle layer 72 of cover 71 to form a coil, and is surrounded by an external insulating layer 73. An inner metallic layer 74 is provided to separate the coil 70 from the exterior of the filter housing 10. Energization of the coil 70 creates a magnetic field around the housing 10, thereby attracting particles to the interior walls of the housing 10 and away from the filter element 12. The filter housings are constructed of ferrous or ferrous alloy materials. The coil 70 carries the current to create the magnetic field. The strength of the magnetic field can be increased by increasing the number of windings. The cover 71 is shielded on the exterior, with the coil 70 therein and slides over the housing 10, thereby making the installation and removal easy.

The filter attachment illustrated in FIG. 8 includes a totally self contained twelve-volt DC electromagnet 80 attached to the base of the housing 10. A powerful electromagnet 80 attached to the base of the housing 10 quite effectively magnetizes the entire housing 10. The magnet 80 should be mounted to a tough acrylic and/or thermoplastic magnetic insulating cover 82 to prevent unwanted external debris from being attracted magnetically to the exterior surface of the filter can and/or the magnetic cap 82. The cover 82 can be secured to the housing 10 by a slight interference-fit, a stationary stud, and/or a clamp 84 surrounding the cap 82.

The magnet 80 can be a bipolar or single pole, six or twelve volt DC electromagnet. The electromagnet has two terminals 86 and 88. The magnet makes direct contact with the base of the housing 10. When it is not energized, the magnet 80 is secured to the housing 10 either by stationary stud 81 and wing nut 83, or by the insulated cover 82.

It is intended that the embodiments illustrated in FIGS. 7 and 8 be reusable products and therefore remain in tact with repeated application. Therefore, the windings should be encased in a tough acrylic plastic and/or a sheet-metal cover held onto the housing 10 by a slight interference-fit such as the cover illustrated in FIG. 3 and described above, demonstrating the slide on magnetizable cover which can be reutilized with a number of filters 9.

Figure 9:
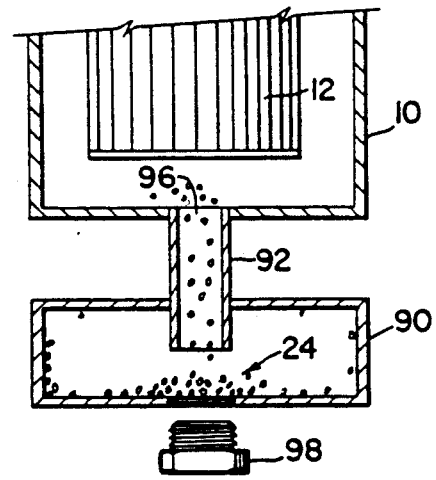
FIG. 9 is a cross-sectional view of the sludge trap of according to the present invention implemented on a filter.

A further embodiment of the present invention is illustrated in FIG. 9, in which the trap 90 for the sludge is removable as a unit to allow for the removal, cleaning and reuse of the trap 90 without the need to remove, disassemble, clean and rebuild the entire filter 9. The housing 10 and internal elements of this filter are stock. The housing is modified to provide an attachment hole 96 in the center of the base to accommodate attachment of a pipe 92 and sludge trap 90. The pipe 92 is provided for channeling the particulate matter 24 out of the housing 10 and into the trap 90. This configuration allows for the removal, inspection, and appraisal of engine condition, quickly, cleanly, and simply, without removal of the filter 9. Instead, the trap 90 can be removed, emptied, cleaned and replaced.

The separation of the small particulate trap area 90 and the main portion of the filter 9 provides for positive deterrence of any reentry of separated particulate matter 24 back into the fluid. The reservoir for the particulate matter 24 is isolated from the high velocity stream of the fluid flow. The magnetic particles have a physically isolated area or reservoir in which to accumulate. Magnetic attraction, pressure, gravity, and inertia will move the ferrous debris to the base of the housing 10 and through tube 92, which is preferably constructed of a non-magnetic material such as aluminum, into the trap 90, which is preferably constructed of ferrous metal. The magnetic plug 98 screwed into the trap 90 attracts the particulate matter 24 which is prevented from reentering the fluid stream and confined to the trap 90. The trap configuration illustrated would be effective in removal of debris even without the magnet, though its effective performance would be decreased.

Figure 10:
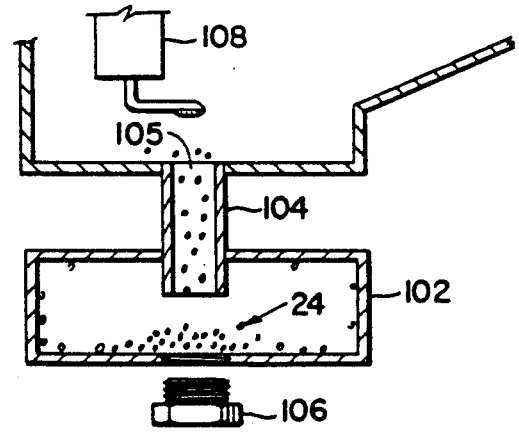
FIG. 10 is a cross-sectional view of the sludge trap of according to the present invention implemented on a fluid reservoir.

A trap 102, as illustrated in FIG. 10, could also be implemented on the drain opening of an oil pan 104 or similar fluid reservoir to attract, isolate and remove particulate matter 24. A fluid reservoir 104 is provided with a trap 102 located directly beneath the pump 108. Oil drainage or access into this area is solely out hole 105 and down through a small tube 104 that extends into the trap 102. The trap is provided with a particulate matter attractive plug 106. Harmful and destructive debris 24 drains into the trap 102, where it is isolated from return to the fluid flow stream.

Any of the above embodiments of the present invention which have been described as implemented on a filter 9, can alternatively be implemented on a trap such as the trap 90 illustrated above. For example, the electromagnetic coil 70 of FIG. 7 could be installed on a trap which is installed on the filter housing 10 instead of sliding the coil jacket directly onto the housing 10.

The magnetic materials which exhibit properties sufficient for the requirements of the present invention, e.g. size, strength, cost and durability are preferably selected from either the Aluminum/Nickel, the rare-earth or the porcelain families of magnetic material. There are a number of specific configurations within these types of magnets which exhibit the required operating temperature, resistance to demagnetization, machinability, and oxidation resistance required for the applications of the present invention. Further, magnets constructed properly from these groups will provide the necessary magnetic attraction to accomplish maximal magnetic filtration within affordable cost and space limitations.

To achieve the maximal magnetic attraction within cost limitations, tradeoffs between attractive force and cost must be weighed. Porcelain material is probably the most cost-effective, as Grade VIII yields approximately ⅜ the power of Alnico V, by weight, at approximately 1/7 the cost. However, SmCo32A grade of rare-earth material will provide almost 10 times the energy of porcelain, by weight, at approximately 50 times the cost. NdFe30H, has approximately the same energy level at 35 times the cost. Initially, either of these rare-earth materials may seem prohibitively expensive, however, when further factors are taken into consideration, such as the tremendous energy density, a lesser amount of material would be required.

Although the initial cost would be higher, these magnets can be reused, therefore the relative cost per use is reduced. If the magnet is given a trade-in value, and the magnets reinstalled at the factory, or, if new replacement filters were configured to allow the user to insert the used magnet into the new replacement filter, this would allow the use of superior performance magnets at a reduced cost per use.

Figure 11:
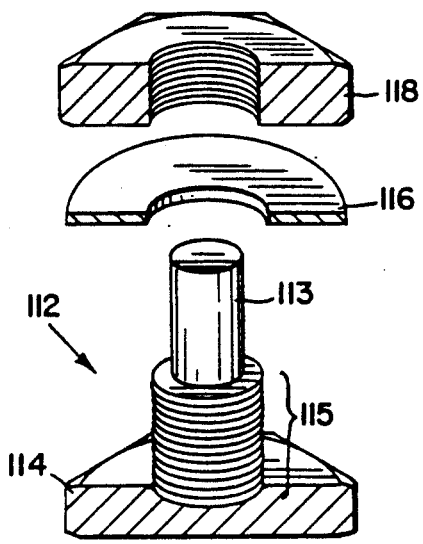
FIG. 11 is a partial cross-sectional view of a magnetic drain plug.
Figure 12:
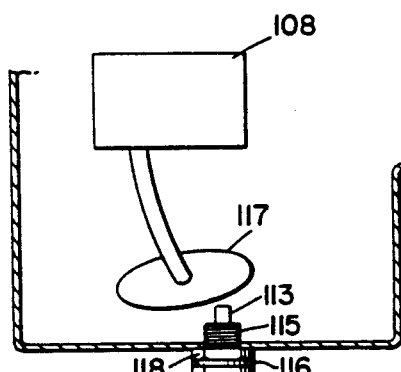
FIG. 12 is a diagrammatic view of the drain plug of FIG. 11 installed in an oil pan.

A further embodiment of the inventive concept of the present invention is illustrated in FIGS. 11 and 12 which illustrate the rare earth drain plug alone, and in place on an engine oil pan respectively. A magnetic engine and/or transmission drain plug is a simple, unique, and potentially very efficient and effective device for helping to rid machines of undesirable and life-threatening ferrous particles. The engine oil filter, unlike the transmission filter which lies ahead of its fluid pump, does not come between the oil in the pan 109 and the oil pump 108. Therefore, the vast majority of modern engines have nothing ahead of the oil pump 108 to filter and thus protect it.

The magnetic rare earth drain-plug 112, designed to replace the ordinary oil-drain plug, usually situated in the lowest point of the oil pan sump area and below the oil pump pick-up, attracts and retains virtually all larger destructive ferrous particles, and at least 50% of the smaller particles before they can enter the oil pump 108.

The tiny magnetic tip 113 must contend with numerous opposing forces of significant magnitude. Therefore, in order to accomplish the attraction and retention of particles as described above, a magnet of considerable attractive power is necessary, thereby rendering lesser magnets inadequate. The opposing forces include 3-9 quarts of high-temperature motor oil mixed with ferrous and non-ferrous contaminates, the significant flow velocities created by the entire rotating mass of crankshaft and connecting-rod throws (at literally thousands of revolutions per minute), and a high-velocity negative pressure zone less than one-inch from the tip of the drain plug created from the draw of the oil-pump 108. As the engine RPM increases, a number of forces are also increased, including increased wear, blow-by gasses, consequent metallic shedding, the suction of the oil-pump 108.

Through the utilization of a drain plug 112 comprising rare earth magnetic material, a sufficient magnetic force can be brought within the limited size constraints of the drain plug and drain plug hole, to allow retrofitting without the need for modification of the existing oil pan structure, to provide effective protection against magnetically attractive particles.

The provision of a rare earth drain plug as taught herein will aid in the prevention of automatic transmission and engine oil-pump wear and/or damage. Although this material is more costly than common magnetic material, since less is needed implementation of the device is still cost effective. Implementation of a rare earth drain plug in accordance with the teachings of the present invention helps to (1) promote an increase in engine and/or transmission life; (2) reduce frictional drag, thereby increasing gas mileage & reducing heat build-up and overheating; (3) promote smoother running and reduced oil-consumption; (4) effectively reduces the workload of the oil filter, reducing clogging, and promoting longer oil-filter life; (5) will trap & hold smaller (less than one micron) ferrous destructive particles than common non-magnetic oil-filters. Further the rare earth drain plug 112 does not wear out and does not require any modification to the existing oil pan and oil plug hole.

Figure 14:
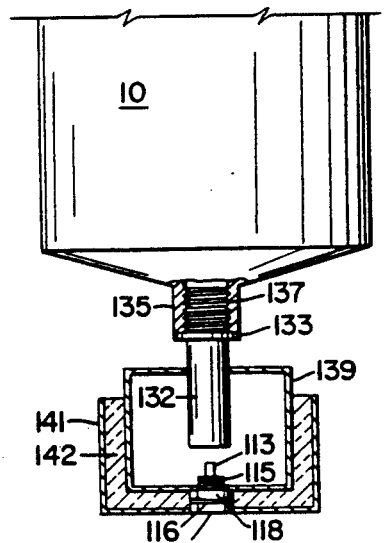
FIG. 14 is a diagrammatic view of one embodiment of the attachment of a trap to a filter can utilizing the transfer tube of FIG. 13.
Figure 15:
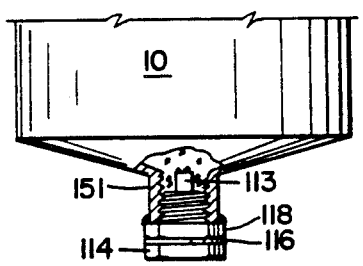
FIG. 15 is a diagrammatic view of a filter with a trap attached.
Figure 16:
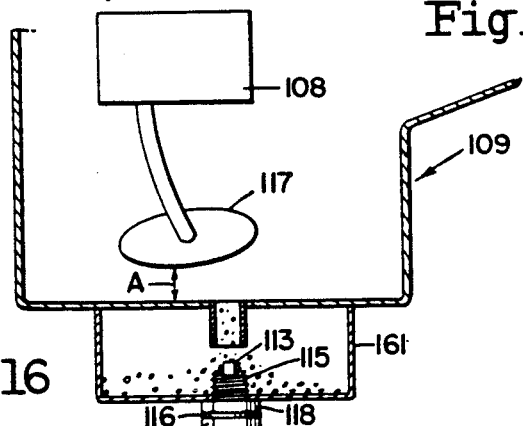
FIG. 16 is a diagrammatic view of a Pan with a filter attached.

The plug 112 is comprised of a hexagonal head 114, a threaded body 115 and the tip 113. A Nylon gasket or washer 116 and a stationary nut 118 are also provided. The stationary nut 118 is attached to the pan 109 as illustrated in FIG. 12 or to the trap as illustrated in FIGS. 14–16. This stationary nut 118 provides an internal thread into which to secure the threaded body 115 of the plug 112. The proximity of the magnetic tip 113 to the pump pickup 117 or trap tube exit, is essential to proper maximum particle attraction and retention.

Figure 13:
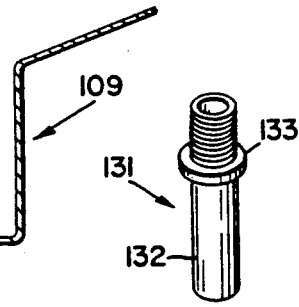
FIG. 13 is a perspective view of a transfer tube.

FIG. 13 illustrates a preferred embodiment of the transfer tube 131 between a trap 141 and either a filter can 10 as illustrated in FIGS. 14 and 15 or an oil pan 109 as illustrated in FIG. 16. The tube 131 is comprised of a hollow tube portion 132 threaded at one end, with a stop member 133 mounted a set position along its length. A nylon gasket 135 is provided, as illustrated in FIGS. 14–16 for sealing the stop member 133 to the filter 10 or the pan 109 respectively. Further, an internally threaded spacer 137 is utilized to properly position the tube 131 with respect to the can 10.

Trap 139 is attached to transfer tube 131 for collection of particles attracted there by plug tip 113. The trap can be provided with an optional magnetic cover 141, with or without optional insulating outer cover 142. The magnetic cover may be of the permanent magnet type or the electromagnetic variety, in which case it would need to be provided with appropriate electrical connectors. An opening is provided in the covers for the drain plug 112.

The drain plug 112 can be applied directly to the filter can 10, as illustrated in FIG. 15. The retaining nut 118 is secured directly to a spacer portion 151 of the can 10 provided for debris collection and storage.

FIG. 16 illustrates the attachment of a trap 161 to an oil pan 109. The pump pickup to pan floor distance A is minimal.

Figure 17:
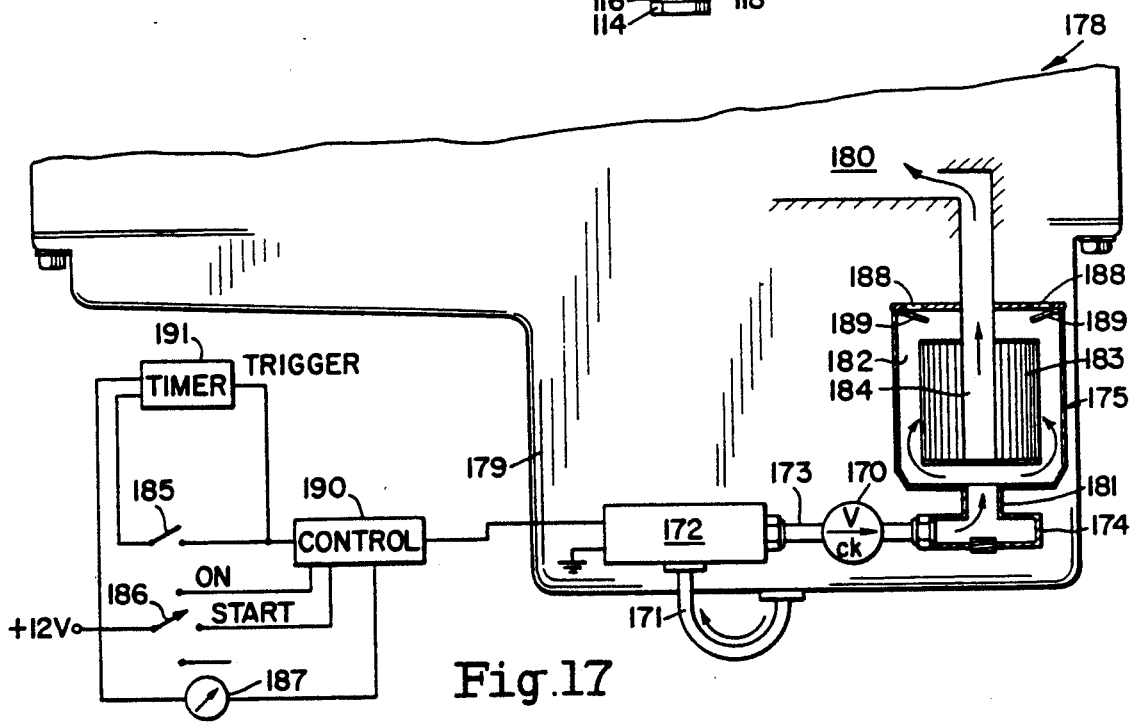
FIG. 17 is a diagrammatic view of the start-up lubrication system of the present invention.

A further aspect of the present invention as a prestart lubrication system is illustrated in FIG. 17, which illustrates the use of an electric auxiliary fluid pump 172 which can be mounted external of the engine 178, in conjunction with a filter 175 and contaminate trap 174 to provide fluid to the moving parts of the engine 178 during start-up. An open end threaded base spin-on, disposable oil filter 175, such as that illustrated in FIG. 9 is utilized for filtration of the return fluid to the engine galleys in the block 180 from the oil pan 179. Filter 175 acts as above when the engine is operating in a non-prestart mode, by allowing ingress of oil through holes 188 in a conventional manner.

One end of an oil line 171 is attached to the oil drain hole at the bottom of the oil pan 179. The other end of the line 171 is attached to an auxiliary pump 172. The pump 172 draws fluid from the pan and supplies it through connecting tube 173 to the trap 174 attached to filter 175. The fluid flows up the connecting tube 181 to chamber 182 of filter 175 where it is pushed through the filter element 183 in the normal direction and thus enters the inner chamber 184 from which it proceeds into the engine block 180. The flow of the fluid is illustrated by the arrows of FIG. 17.

The auxiliary pump 172, lines 171 and 173 should be mounted externally of the engine block 180 and preferably on the same side as the filter 175 for ease of access. If the pump 172 is utilized for drainage of oil, it will aid in the process if the lines and the filter 175 can be accessed from the same point.

The auxiliary pump 172 need only be of small capacity, such as 12 to 18 PSI to provide the necessary flow for conventional automotive internal combustion engines. The pump 172 can be actuated in a number of ways to provide for its operation in the critical start-up period. First an independent switch 185 could be provided within reach of the operator of the engine. The switch 185 would be tripped just prior to operation of the ignition switch 186. If an auxiliary switch 185 is utilized, a timer 191 is triggered by actuation of switch 185 to deactivate pump 172 after 10 seconds of operation. During "high G" force situations and/or high engine rpm, undesirable air bubbles, resulting in a loss of lubrication, can be induced into the oil stream as a result of cavitation of either the main pump or the auxiliary pump 172. The main pump and auxiliary pump should, therefore, not be allowed to run simultaneously for a longer period than necessary to provide prelubrication to the engine block 180. In the described embodiment, this period is 10 seconds; however, a shorter or longer period can be utilized as necessary.

In a second preferred method, the auxiliary pump 172 could be connected to the standard ignition switch 186 to be actuated when the switch is in the "on" position prior to movement of the switch to the "start" position, thus relieving the operator of the task of actuating the pump 172 prior to each start. Control device 190 is provided so that the pump would remain activated while the key was in the "start" position, until the key was returned to the "on" position wherein the main pump would have taken over and the auxiliary pump 172 would then be disconnected. Alternatively, the pump 172 can be connected to both the start switch 186 and the independent switch 185 thus providing the user with the option of independent operation of the pump 172. Provision of switch 185 allows for operation of the pump 172 independent of starting the engine such as when it is desirable to use the pump 172 to empty the fluid reservoir when changing a filter.

In a third alternative, the pump can also be connected to the oil pressure sensing circuitry 187 so that the pump 172 is actuated when the oil pressure falls below some threshold value. This would have the effect of not only actuating the pump 172 during the start-up period but also of actuating the pump as a back-up to the main oil pump in the event of failure even during normal engine operation after start-up. Standard oil pressure sending units 187 commonly activate at 2 to 3 psi, however, it is desirable to have the auxiliary pump 172 be activated at 12 to 15 psi, therefore, it may be necessary to modify or replace existing sending units in some applications. Control device 190 would receive the input from sending unit 187 and activate pump 172 accordingly. The pump could also be connected to other engine condition monitoring systems such as the temperature gage or the engine computer as a further failsafe mechanism.

To prevent the flow of fluid out of chamber 182 backwards out holes 188 and through the normal lubrication in a reverse direction, one way valves 189 have been provided. In order to prevent the pressure from the main fluid pump from causing a reverse flow through auxiliary pump 172, one way valve 170 is provided in line 173.

The use of the start-up lubrication system eliminates the necessity for small volume filters, because the fill lag time is eliminated.

Oil changes can be quickly and easily performed without the need to remove the oil drain plug. The mechanic removes the filter 175 from the engine and the line 173 from the filter. The open end of line 173 is placed into a used oil receptacle and auxiliary pump 172 is actuated such as by switch 185. The switch may of course have to be activated a number of times in order to insure full drainage of the system, as the pump will be deactivated by 191 after a predetermined time period which alyhough appropriate for startup, may be insufficient for full system drainage. Alternatively, a second independent switch may be provided in the vicinity of the filter for easy access by the service personel, this switch would not be provided with a time limiter. The oil is pumped out from the lowest point in the reservoir. The filter is then replaced by a new filter and the system is ready. Lines 171 and 173 can be made of a flexible tubing, such as small hydraulic line and couplings (such as utilized on power steering pumps), a braided steel or can be constructed of formed rigid metal tubing. Flexible tubing allows for greater ease in oil changes. After the change of filter, the reconnection of the lines and the replacement of oil, the pump 172 is operated again to fill the filter and lubrication system.

If a flexible line is utilized, it can easily be maneuvered to fill an oil disposal container. If however the line is rigid, a flexible hose can be fitted over the exposed end of the line to allow access for oil removal.

As an alternative to the one way valving 189 in the filter 175, the engine can be provided with one way valving to prevent the inflow of lubricant from the inlets 188 of the filter 175.

The fluid return system can also be utilized to provide pre-lubrication to other engine components such as turbochargers and the like. The invention can also be implemented on other engines. For example boat, airplane or tractor engines which often sit idol for long periods of time can be automatically magnetically filtered and pre-lubricated. Prior pre-lubrication such as by hand priming only offered a supply of dirty unfiltered lubricant and was often extremely difficult to implement.

A non-preferred embodiment for implementation of the invention would be to bypass the filter 175 and supply the oil from line 173 directly into a preexisting threaded galley hole in the engine block 180. This method of prelubrication is not preferred because it eliminates the desirable filtering. A secondary filter could be added to the line in this embodiment, however this filter may be neglected during servicing and would therefore be an impractical alternative. Alternatively, the oil from line 173 could be introduced into the block where filter inlets 188 are normally supplied with oil. This would provide for filtering of the oil from line 173 prior to its introduction into the engine. This would require the access into the block at this point, or the provision of a collar for the filter to allow access between the filter 175 and the block 180.

Figure 18:
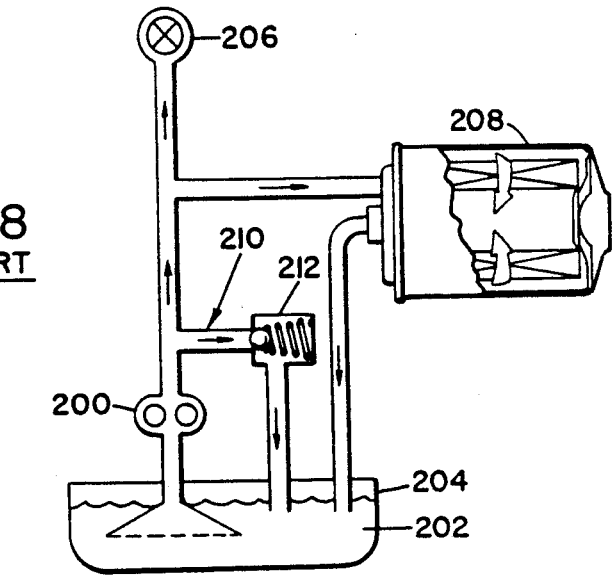
FIG. 18 is a diagrammatic view of a prior art diesel bypass lubrication system.

The filtration devices and methods described above also have further application in lubrication systems referred to as by-pass, diesel bypass or part flow systems such as the prior art system illustrated in FIG. 18. In the lubrication system of FIG. 18, a main pump 200 is utilized to provide lubricating fluid 202 from a reservoir 204 to the bearings 206 of a machine such as an engine. A by-pass filter 208 is provided for filtration of the lubricating fluid 202. In a by-pass, diesel bypass or part flow oil filtration system, only a small portion (about 10%) of the fluid flow from the pump 200 is filtered in the by-pass filter 208. The filtered fluid is borrowed from the excess oil which would ordinarily be returned to the engine oil pan reservoir 204 through a passageway 210 controlled by the pressure regulating valve 212. Oil flow through by-pass filter 208 is regulated through the use of a metering orifice within the filter. The fluid which has been filtered is returned to the reservoir 204 directly and is not supplied to the bearings 206 of the machine as in a full flow system described above.

Figure 19:
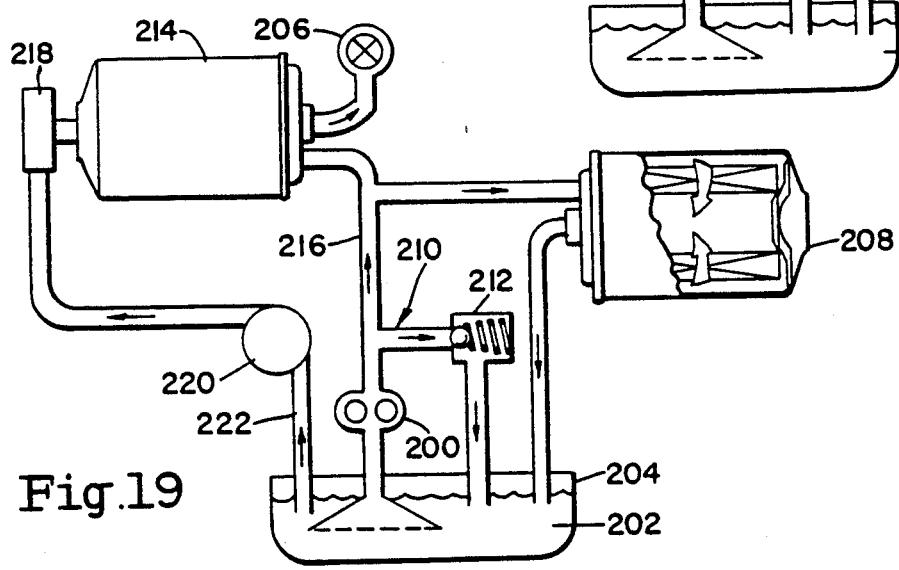
FIG. 19 is a diagrammatic view of a diesel bypass system with an additional full-flow system according to the teachings of the present invention implemented thereon.
Figure 20:
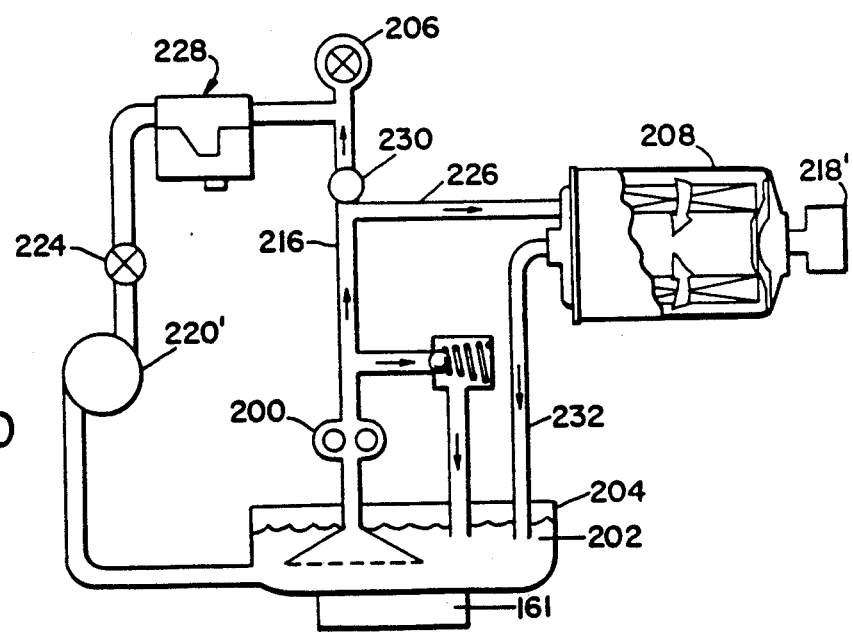
FIG. 20 is a diagrammatic view of a bypass system with a remote line trap filter according to the teachings of the present invention implemented thereon.

FIGS. 19 and 20 illustrate two alternatives for embodying the teachings of the present invention in a by-pass or diesel bypass lubrication system.

In the embodiment of FIG. 19, the main line 216 between the primary pump 200 and the bearings 206 is by-passed through full flow filter 214. Full flow filter 214 is also provided with a secondary input from trap 218 which is supplied by auxiliary pump 220 which draws fluid 202 from reservoir 204 via line 222. In this manner, full flow filter 214 acts to filter all oil provided to bearings 206. Also, through the use of auxiliary pump 220, lubricating fluid can be provided to the bearings 206 prior to startup and actuation of primary pump 200, as explained in greater detail above with reference to the prelubrication embodiment of the present invention. Further, bypass filter 208 can be provided with a rare-earth drain plug and trap as described above and/or pan 204 can be provided with a trap such as trap 161 of FIG. 16 above.

In the embodiment illustrated in FIG. 20, the secondary pump 220' and remote line trap 228, illustrated in detail in FIG. 21 and described below, are provided directly between reservoir 204 and the bearings 206. Again, prelube fluid is provided for bearings 206 through actuation of pump 220'. One-way valve 224 is provided to prevent backflow through the prelubrication system when primary pump 200 is activated to supply lubricant 202 to bearings 206. Alternatively, pump 220' can be provided with a built-in or internal check-valve to prevent back flow. Further, additional one-way valve 230 is provided in the main supply line 216, to prevent return flow of fluid to the reservoir 204 during prelubrication operation of the engine in accordance with the present invention.

Given the structure illustrated in FIG. 20, when prelube auxiliary pump 220' is activated, fluid 202 is drawn from reservoir 204 and supplied through remote line trap 228 to bearing 206. Remote line trap 228, as detailed below, traps and removes a significant amount of contaminate debris from fluid 202. Further, the line trap differs from a usual remote spin-on filter in that it: is smaller, lighter, requires no mounting and additional space, cannot clog, does not reduce or impede oil flow under normal operating conditions, can be cleaned and reused, requires no additional quality/expense of lubricant, traps both ferrous and non-ferrous particles of which the prior will be trapped as small as less than 1 micron in size by virtue of its rare earth plug, and epitomizes consumer convenience.

Finally, also by virtue of its use with a single, low-pressure line mounted below and spaced away from the hot exhaust manifold, the consumer can safely service the remote line trap. The risk of oil leakage and consequent threat of fire hazard through contact with the hot exhaust manifold is greatly reduced. Typical prior art remote spin-on applications often require two lengths of extra long and large exterior diameter oil lines with numerous fittings and adapters for installation. The extra length of line and the numerous fittings and adapters all provide for greater, increased chances of leakage. Further, the large remote spin-on filters contain large quantities of flammable lubricant and are often mounted above the hot exhaust manifolds for ease of access. However, this location can also greatly increase the chance of the above-mentioned risks. Further, the expense of replacement of the filter and the extra lubricant needed to fill the filter must be incurred at every oil change with prior art spin-on add-on secondary filter systems. It is necessary to change both the filter and all the oil in order to prevent any of the old supply of oil mixing with the new supply of oil at an oil change. The line trap does not require the extra oil nor replacement, as the line trap can be cleaned whereas the secondary add-on spin-on filter cannot be cleaned but must be replaced. Therefore, the line trap greatly reduces the costs associated during servicing.

Figure 21:
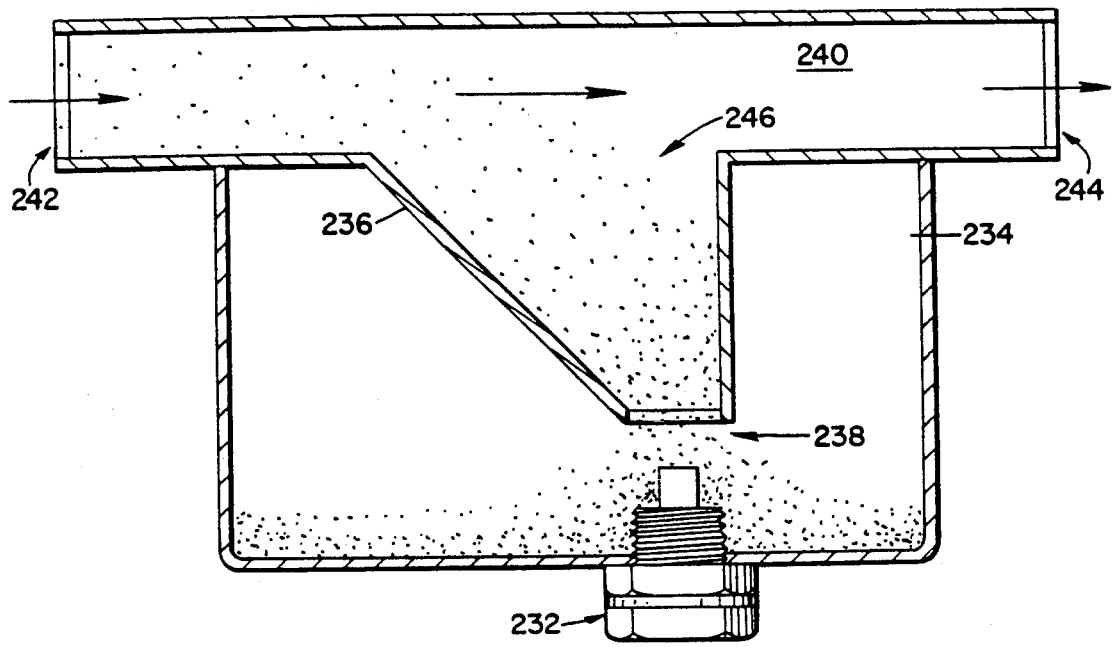
FIG. 21 is a detailed cross-sectional view of a remote line trap filter according to the present invention.

FIG. 21 is a detailed cross sectional view of the remote line trap 228 illustrated in FIG. 20. The remote line trap 228 utilizes a rare earth drain plug 232 of the type described in detail above for attraction of ferrous particulate matter within the trap body 234. Other non-ferrous particulate matter is also trapped within the trap body 234 by the action of the entrance ramp 236 which leads to opening 238 from the flow-through tube 240 into the trap body 234. The fluid to be filtered enters through entrance opening 242 into the flow-through tube 240 and exits out exit opening 244. While travelling through transport tube portion 240, particulate matter within the fluid drops through opening 246 in the flow-through tube 240 and is conveyed down entrance ramp 236 and out opening 238 into trap body 234. The remote line trap 228 can be disassembled to allow for emptying of the trap body 234 to remove particulate matter to cleanse and refurbish the line trap 228. Further, rare earth plug 232 is removable and can be cleaned independently. Also, the particulate matter can be drained out the hole left by removal of the rare earth plug 232.

Figure 22:
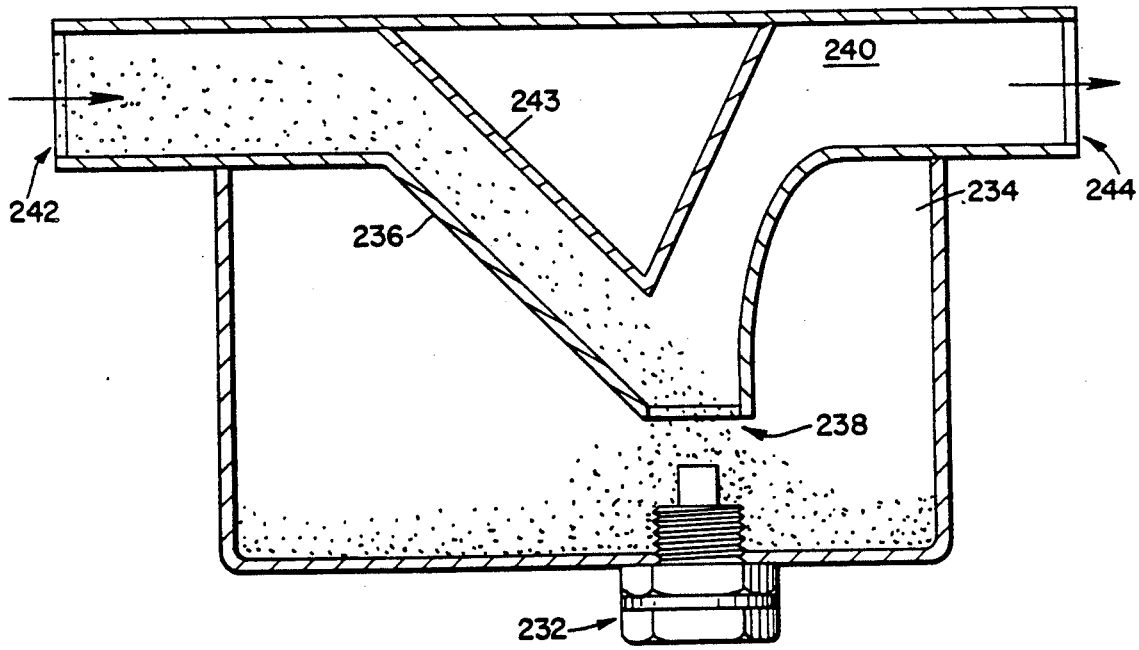
FIG. 22 is a detailed cross-sectional view of an alternative remote line trap according to the teachings of the present invention.

FIG. 22 is a detailed, cross-sectional view of an alternative remote line trap which illustrates an additional flow director 243 not provided in the line trap of FIG. 21. This remote line trap operates in the same manner as the trap illustrated in FIG. 21 with the additional feature of the flow director 243. Through incorporation of the flow director 243, when the fluid to be filtered enters through the entrance opening 242 into the flow-through tube 240, it is directed downwardly and then upwardly by director flow 243 as it passes through tube 240 and then exits out exiting opening 244. While travelling through transport tube section 240, particulate matter within the fluid is conveyed out opening 238 as it tends to continue in a linear direction from its downwardly directed travel and therefore out opening 238 as opposed to turning and flowing upwardly with the remaining fluid and out exit opening 244.

Either of the illustrated remote line traps aid to provide the particulate matter carrying oil with an extended period of dwell time in the range of the magnetic influence attraction of the drain plug 232 to provide for extra trapping of particulate matter. Through the widened cavity, as well as the deepened area, an environment which is conducive to extending and expanding the exposure of the particulate ladden fluid to the magnetic attracting medium for particle capture, as the fluid's downstream component leaves the trap is provided. Aiding this attractive capture and retention is the fluid's natural selfadhesion which combines to force the flow of fluid downward towards the trap and magnet.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense, the invention being defined in the following claims.

I claim:

1. In a filter for removal of particulate matter from a fluid, having a housing, an entrance opening for ingress of said fluid, an exit opening for egress of said fluid after filtering and a microporous barrier for separating said housing into a first outer chamber in fluid communication with said entrance opening and a second inner chamber in fluid communication with said exit opening and linking said chambers in fluid communication through said barrier, the improvement comprising:
    means for magnetically attracting and retaining said particulate matter, including a magnetic end cap member providing a magnetically attractive force adapted to surround one end of said filter remote from said entrance and exit openings and adjacent an exterior wall of said first chamber for attracting said particles toward said exterior wall of said first chamber remote from said barrier.

2. A filter according to claim 1, wherein said end cap is made of a permanently magnetic material.

3. A filter according to claim 1, wherein said end cap includes an electromagnetic element.

4. A filter according to claim 1, wherein said attracting means includes a magnetic element helically wound about the exterior surface of said filter.

5. A filter according to claim 4, wherein said helical element is comprises of a permanent magnetic material.

6. A filter according to claim 4, wherein said helical element includes an electromagnetic member.

7. A filter according to claim 1, wherein said attracting means includes a sleeve-like cover for surrounding said filter,
    said sleeve-like cover including:
    a metallic layer contacting said filter,
    a magnetic layer including a helically wound electromagnetic coil, and
    an outer insulator layer.

8. A filter according to claim 1, wherein said attracting means includes a plug insertable into a chamber in fluidic communication with said entrance opening and fluidically separated from said exit opening by said microporous barrier.

9. A filter according to claim 8, wherein said chamber is connected to said entrance opening by a fluidic passageway having a constricted flow cross-section.

10. A trap for the containment of particulate matter, comprising: means for cooperating with a filtration system, including
    a housing having a first entrance opening attached to a fluidic reservoir for the ingress of said particulate matter,
    an isolation chamber within said housing for accommodation of said particulate matter, and
    means for magnetically attracting said particulate matter from said reservoir through said opening and into said chamber.

11. The trap of claim 10, wherein said attachment means includes an elongated tube for passage of said particulate matter from said reservoir to said trap.

12. The trap of claim 11, wherein said tube is provided with means for adjusting the depth of said tube in said reservoir.

13. The device of claim 11, wherein said tube has a flow cross-section so as to constrict the fluid communication between said reservoir and said trap so as to inhibit the return flow of said particulate matter from said trap to said reservoir.

14. The trap of claim 13, wherein said fluid reservoir includes a fluid pump pickup disposed within said reservoir, and
    said tube extends into said reservoir in close proximity to said pickup, oriented so that an open end of said tube is adjacent said pickup means.

15. The trap of claim 10, further including means surrounding said trap for magnetically attracting said particulate matter.

16. A lubrication system for distributing lubrication fluid from a fluid reservoir to an engine galley, comprising: means for cooperating with a filtration system, including
    a fluid pump,
    a first fluid line connecting said pump to said fluid reservoir,
    a second fluid line connecting said pump to said engine galley, and
    first actuation means for activating said pump during operation of said engine,
    a filter fluidically connected between said second line and said engine galley and including a magnetically attractive element,
    first switch means for activating said pump independent of the operation of said engine,
    timer means for deactuating said switch means,
    pressure sensitive switch means for activating said pump dependant upon the fluid pressure, and
    control means for differentiating inputs from said first, second and third actuating means to derive a control signal therefrom, and for actuating said pump dependent upon said control signal.

17. In a filter for removal of particulate matter from a fluid, having a housing, an entrance opening and an exit opening located proximate a first end of said housing for ingress and egress of said fluid respectively, a microporous barrier for separating said housing into a first outer chamber in fluid communication with said entrance opening and a second inner chamber in fluid communication with said exit opening and linking said chambers in fluid communication through said barrier, and a fluid flow path from said entrance through said first chamber, said barrier, and said second chamber to said exit, the improvement comprising:
- a third chamber in fluid communication with said first chamber and isolated from said fluid flow path and including means for magnetically attracting and retaining said particulate matter.

18. A filter according to claim 17, wherein said magnet and said chamber are removably mounted to said housing.

19. A trap for the containment of particulate matter, comprising: means for cooperating with a filtration system, including
- a housing having a first entrance opening and a second exit opening attached to a fluidic stream for passage of said fluid through said trap in a fluid stream,
- an isolation chamber separated from said fluid stream within said housing for accommodation of said particulate matter, and
- means for magnetically attracting said particulate matter from said fluid stream into said chamber.

* * * * *